(12) United States Patent
Sulzbach et al.

(10) Patent No.: US 6,544,481 B1
(45) Date of Patent: Apr. 8, 2003

(54) APPARATUS FOR THE PRODUCTION OF FOAMED MATERIAL FROM A REACTION MIXTURE CONTAINING A DISSOLVED FOAMING AGENT

(75) Inventors: Hans-Michael Sulzbach, Königswinter (DE); Reiner Raffel, Siegburg (DE); Florian Thiebes, Königswinter (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 09/474,976

(22) Filed: Dec. 29, 1999

(51) Int. Cl.[7] ............................................... B32B 27/04
(52) U.S. Cl. ..................... 422/133; 422/134; 422/135; 422/224; 422/225; 422/228
(58) Field of Search ................. 422/133, 134, 422/135, 224, 225, 228; 521/79, 130, 133, 155; 261/DIG. 26; 366/158.5, 182.1, 192, 336

(56) References Cited

U.S. PATENT DOCUMENTS

| 3,063,952 A | * 11/1962 | Vieli | 261/122.1 |
| 3,343,214 A | 9/1967 | Myers | |
| 3,833,202 A | * 9/1974 | Crystal | 264/51 |
| 5,356,565 A | * 10/1994 | Southwell | 166/309 |
| 5,625,091 A | * 4/1997 | Buysch et al. | 558/274 |
| 5,789,457 A | 8/1998 | Eiben et al. | |
| 5,833,930 A | 11/1998 | Sulzbach et al. | |
| 5,840,778 A | 11/1998 | Althausen et al. | |

FOREIGN PATENT DOCUMENTS

| DE | 196 20 991 | 11/1997 |
| WO | WO 9600644 A1 * | 1/1996 |

* cited by examiner

Primary Examiner—Jerry D. Johnson
Assistant Examiner—Basia Ridley
(74) Attorney, Agent, or Firm—Joseph C. Gil; Noland J. Cheung

(57) ABSTRACT

Reaction mixtures which form polyurethane foamed material, with production conditions which are varied during production, e.g. variation of the proportion of foaming agent, variation of the ratio of reaction components, variation of the throughput, or fine adjustment, can be produced by employing an improved apparatus which comprises a depressurisation element (creamer) (10), wherein a perforated plate or sieve plate constructed as a first throttle plate (24), and a second perforated or sieve plate, which is constructed as a throttle plate (26, 27, 28) and which is disposed downstream thereof, are disposed in the creamer (10), wherein the spacing a between these two throttle plates (24, 26) can be varied during operation in accordance with the variable production conditions, and wherein a calming element (29) is disposed after the second throttle plate (26) in the direction of flow.

7 Claims, 3 Drawing Sheets

APPARATUS FOR THE PRODUCTION OF FOAMED MATERIAL FROM A REACTION MIXTURE CONTAINING A DISSOLVED FOAMING AGENT

FIELD OF THE INVENTION

This invention relates to an apparatus for the production of foamed material from a reaction mixture of free-flowing reaction components which contains a dissolved foaming agent, consisting of a mixing chamber having an outlet opening and having feed lines for the reaction components, wherein at least one of the feed lines comprises an element for the introduction and dissolution of foaming agent, and wherein a depressurisation element (creamer) adjoins the outlet opening (DE 44 22 568 C1).

BACKGROUND OF THE INVENTION

During the production of foamed material, and during the production of polyurethane foamed material from isocyanate and polyol in particular, the function of the dissolved foaming agent is to change into its gaseous state due to depressurization on its emergence from the creamer, to become attached to the nucleating seeds formed, and to form pores in the foamed material.

Suitable foaming agents include fluorinated hydrocarbons, which can no longer be used for reasons of protecting the environment, pentane, and carbon dioxide, which has been used recently in particular.

In order to produce a foamed material with a uniform apparent density, it is necessary to ensure firstly that sufficient, uniformly distributed nucleating seeds are formed before the depressurization of the reaction mixture and secondly that the entire foaming agent is not depressurized until it has left the creamer, and when it changes to its gaseous state and becomes attached to nucleating seeds which have already been formed, pores of uniform size are formed which are uniformly distributed in the foamed material.

In the creamer, which is disposed downstream of the mixing chamber, the flow of reaction mixture is therefore throttled by means of at least one perforated plate or sieve plate which serves as a throttle element and which thereby ensures that the requisite pressure is maintained so that the foaming agent remains in its dissolved state. 10% of this at least one sieve plate is open, for example, and it comprises about 1270 holes per $cm^2$ with a diameter of 0.1 mm. Very finely perforated plates or fine sieve plates are used, wherein the number of holes per $cm^2$ and the number of sieve plates depend, amongst other factors, on the pressure which has to be maintained.

In order to obtain the optimum foamed material, it has already been proposed that the size of the active surface area of the perforated plate be adjusted correspondingly at the commencement of the foaming process by means of screens which can be adjusted outside the creamer and which are thus held on one side (DE 195 24 434 A1). However, since these screens are disposed on an inclined holding device, they are unstable; and since areas of different size of the perforated plates or sieve plates are covered depending on the adjustment made, the flow is inhomogeneous on account of the varying cross-section of the flow channel or on account of the varying flow path.

Attempts have also already been made to make the adjustment by means of a gap with an adjustable height (DE 195 24 434 A1). This height-adjustable gap is disposed between two solid, flared faces or between a solid face and a perforated plate or sieve plate. It has been shown here also that adjusting the gap height not only changes the pressure in the desired manner, but also changes the flow relationships in an unwanted manner. However, the formation of nucleating seeds is also changed thereby in a disadvantageous manner, and uniform formation of pores cannot be ensured.

Finally, it has already been proposed that a calming element in the form of a calming sieve be associated with a flared gap (EP 0719 627 A2). Here also, homogeneous flow cannot be ensured, because the efflux of reaction mixture from the gap occurs substantially parallel to the calming sieve, due to which there is a broad spectrum of residence times and a deflection at right angles has to be made again for passage through the calming sieve, whereby the resulting swirl also has an undesirable sustaining effect on the width of the residence time spectrum.

Carbon dioxide is currently used in particular as a foaming agent for the production of polyurethane foamed material, even though this technique is difficult to control. This applies both to foaming in situ and to continuous production processes in particular, such as the production of block foamed material, the production of slabs on a double conveyor belt, and the coating of textiles. Since carbon dioxide suddenly changes into its gaseous state on depressurization, the susceptibility to problems is particularly high here, and it is difficult to achieve perfect quality of the foamed material.

If the installation is designed for constant production conditions, foamed material of satisfactory quality is generally obtained. Constant production conditions over extended periods are rare, however, on account of high throughputs and very different customer requirements.

During the continuous production of polyurethane foamed material, for example, it is necessary to produce different types of foamed materials with different apparent densities. In order to achieve this, the proportion of foaming agent has to be varied. Accordingly, the creamer has to be matched to the new production conditions by the installation of further sieve plates or perforated plates or by the replacement of sieve plates or perforated plates disposed in the flow channel by others with a different passageway area or with a different permeability. This of course has the disadvantage that production has to be stopped for a certain time for the replacement of the sieve plates or perforated plates. When it is considered that modern block foamed material installations operate at a production speed of about 5 m/minute, the high production outage is obvious. Furthermore, when the block foamed material installation is re-started the first few meters of block foam which are produced are rejects. Moreover, it is not possible to make fine adjustments by means of fixedly installed perforated plates or sieve plates in order to optimize the processing of the reaction mixture at the commencement of production.

During foaming in situ, which is of course operated with short interruptions during operation on account of the cyclic production procedure, short-term changes in production conditions likewise have to be made frequently. When the production conditions are changed, the creamer has to be flushed out if necessary.

A change in production conditions generally occurs due to a change in the proportion of foaming agent in the reaction mixture, due to a change in throughput, and/or due to a change in the ratio by volume of the reaction components to one another.

Not only is the aforementioned fine adjustment often necessary at the commencement of production in order to obtain the optimum foamed materials, but subsequent adjustment during operation is often desirable also.

SUMMARY OF THE INVENTIONS

The object of the present invention was therefore to create an improved apparatus for producing the optimum foamed materials with a uniform pore size or bubble size from reaction mixtures containing dissolved foaming agent, which installation can be adjusted during production or can be adjusted to match changed production conditions.

This object is achieved by the provision of two perforated plates or sieve plates, which are constructed as throttle plates and which are disposed transversely to the direction of flow in said depressurisation element (creamer), wherein the spacing a between said two throttle plates can be varied during operation, and by the provision of a calming element which is disposed after the second throttle plate in the direction of flow.

DETAILED DESCRIPTION OF THE INVENTION

Figure 1:
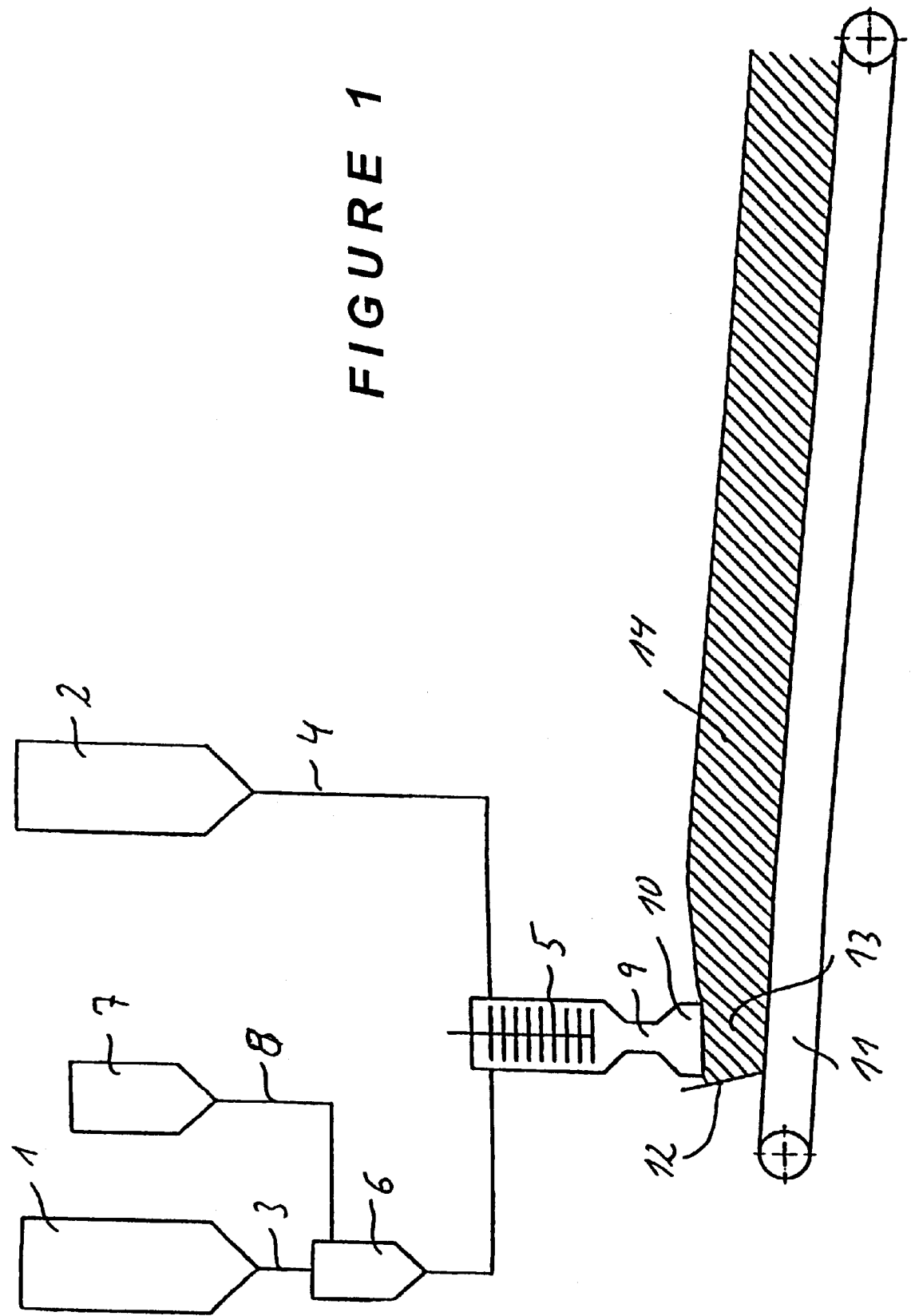
FIG. 1 shows a side view of the block foaming installation with the creamer.

It is thus ensured, by varying or adapting the spacing a between the two perforated plates or sieve plates, that a homogeneous field of flow and a short residence time are maintained when the production conditions are changed or when a fine adjustment is made, whereby the uniform formation of nucleating seeds is also ensured, and whereby the premature transformation of foaming agent into its gaseous state is prevented.

If the proportion of foaming agent is increased during operation, the mixing chamber pressure has to be increased and the spacing a has to be reduced correspondingly. If the mass throughput of reaction mixture is increased, the spacing a has to be increased in order to keep the mixing chamber pressure constant at a constant proportion of foaming agent. If the quantitative ratio of the proportion of polyol to the proportion of isocyanate is varied, any adaptation of the spacing a which is necessary has to be determined empirically. The magnitude of the change in the spacing a is obtained from tables or graphs of empirical values.

The term "during operation" should be understood to mean an intervention which is made during continuous operation while the installation is running. During foaming in situ, this intervention is generally made in the short time intervals between two mold filling operations.

In the course of this procedure, it is important that the reaction mixture which contains foaming agent is calmed again by a calming element after its substantially homogeneous outflow from the last throttle plate. It is in fact known from EP 0 719 627 A2 that a calming sieve can be provided behind a gap. Here, however, the reaction mixture which emerges from the gap is deflected before it flows through the calming sieve with a further deflection. The swirl which thus occurs before the calming sieve gives rise to an unfavourable spectrum of residence times, so that both an unwanted formation of nucleating seeds and an unwanted, premature transition of the foaming agent into its gaseous state occur, whereby pores or bubbles of non-uniform size are formed during the production of the foamed material. In contrast, in the new solution according to the invention linear flow already exists before the calming sieve, so that an extraordinarily short, constant residence time exists as seen over the flow cross-section. Moreover, with this new solution, the formation of pores or bubbles does not commence until the mixture has passed through the calming element, so that all the conditions are created for the production of a homogeneous foamed material.

The actual depressurization first occurs behind the calming element, and in fact the volume of the reaction mixture suddenly increases here due to the attachment of the foaming agent to the nucleating seeds and due to the immediate, sudden transition of the foaming agent into its gaseous state. When carbon dioxide is used as the foaming agent, for example, the reaction mixture swells to about ten times its volume. Attachment to the nucleating seeds occurs very uniformly in the course of this process, so that a homogeneous foamed material is produced which has a uniform pore or bubble size and distribution.

It is only with this new combination of apparatus features that an effective fine adjustment can be made. Moreover, due to the variability of the aforementioned spacing of the two throttle plates from each other the apparatus can also be adjusted to match altered production conditions during operation, namely without stopping production. Thus, for example, the prerequisites are fulfilled for the direct production in succession of foamed materials with different apparent densities without interrupting the current production of the installation, and without considerable losses due to rejects.

According to a first advantageous embodiment, the depressurization element consists of a first housing part and a second housing part, wherein the first throttle plate in the direction of flow is fixedly attached to the first housing part, whilst the second throttle plate and the calming element are fixedly disposed in the second housing part, and wherein the spacing a between said two throttle plates can be varied by adjusting the two mutually sealed housing parts in relation to each other.

The two housing parts can be adjusted in relation to each other by means of an adjusting device, which will not be described in detail. The technology which is available for comparable tasks forms a satisfactory model for an adjusting device such as this. It is self-evident that a pressure-tight sliding seal must be present between the two housing parts. One or the other housing part can be adjusted, depending on the construction. The ability to adjust the second housing part is advantageous, because the spacing of the creamer or the first throttle plate in the first housing part from the mixing chamber then always remains constant, and movement of the first housing part, possibly together with the mixing chamber, is avoided.

According to a second advantageous embodiment, the first throttle plate in the direction of flow is adjustably disposed in the depressurization element, whilst the second throttle plate and the calming element are rigidly disposed therein, and the spacing a between the two throttle plates can be varied by adjusting the first throttle plate.

Here also, an adjusting device which will not be described in detail is required for the throttle plate, which is preferably provided with a guided shaft. This provides the advantage that when the first throttle plate is installed it can be introduced into and fixed within the depressurization element from the end thereof. Alternatively, two housing parts can be used which can be sealed from each other and which are rigidly attached to each other. In both these cases, there are no particular sealing difficulties.

It must be ensured that the throttle plates are sized or designed so that the deformation caused by the action of pressure is significantly less than the gap spacing a, in order to ensure homogenous flow.

For example, the first throttle plate can have conical points on its outlet side between its larger holes. These points point into the correspondingly tapered holes of the second throttle plate which are situated below them, so that a multiplicity of gaps of the same kind is present therebetween. When the spacing between these two throttle plates is altered, the height of all the gaps is altered simultaneously.

The calming element preferably consists of at least one sieve plate. Alternatively, the calming element consists of a sintered metal plate.

According to a further particular embodiment, at least one further throttle plate is disposed between the second throttle plate and the calming element.

It is thus ensured that throttle plates of different permeabilities can be disposed in series, so that the throttling effect behind the first throttle plate can be effected in a plurality of stages up to the desired maximum value.

According to a further particular embodiment, at least one sieve plate or sintered metal plate is disposed in front of the first throttle plate in the direction of flow.

Placing at least one sieve plate or perforated plate such as this and/or at least one sintered metal plate in front of the first throttle plate serves to homogenize the flow and to capture impurities.

Two examples of embodiments of the new apparatus are illustrated in purely schematic form in the drawings, and relate to a continuously operating block foam installation as an example.

The block foam installation shown in FIG. 1 consists of storage vessels 1, 2 for polyol and isocyanate. Feed lines 3, 4 lead from the storage vessels 1, 2 into a mixing chamber 5. A pressurized mixing element 6 is disposed in the feed line 3 for polyol. A feed line 8 leads from a foaming agent container 7 for carbon dioxide into the pressurized mixing element. A depressurization housing 10, namely a creamer, is disposed downstream of the outlet opening 9 of the mixing chamber 5. The depressurization housing opens on to a conveyor belt 11. A backflow barrier 12 ensures that the foaming reaction mixture 13 which emerges from the creamer 10 cannot flow in the opposite direction to the direction of conveying of the conveyor belt 11. Due to the depressurization of the reaction mixture 13 when it emerges from the creamer 10, the carbon dioxide, which suddenly changes into its gaseous state, results in the swelling of said reaction mixture 13 to form a foamed material block 14 which is continuously conveyed away.

Figure 2:
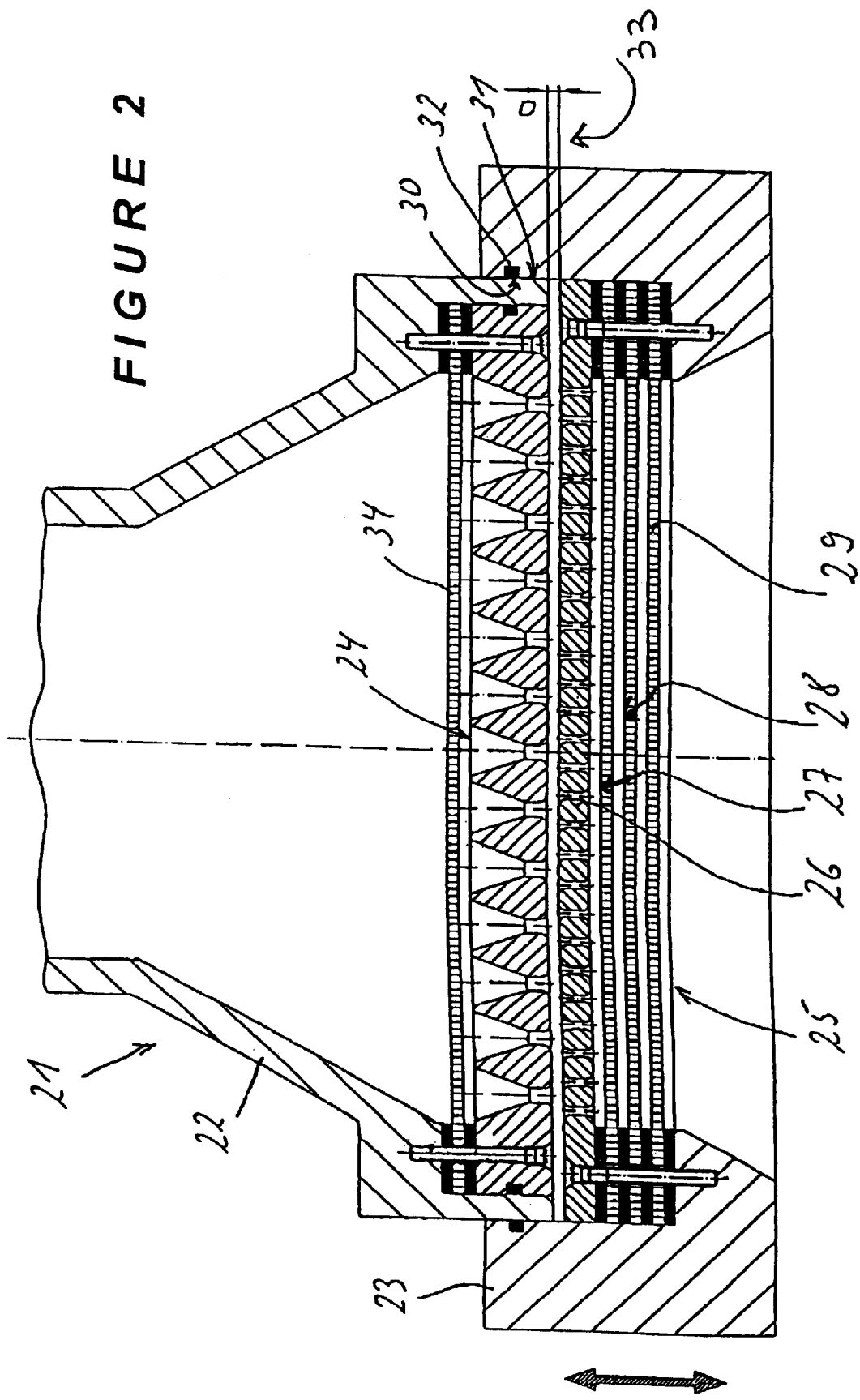
FIG. 2 shows a sectional illustration, on an enlarged scale, of a first embodiment of a creamer.

The creamer 21 shown in FIG. 2 consists of a housing part 22 and a housing part 23. Housing part 22 adjoins the outlet opening 9 (FIG. 1) of the mixing chamber 5 (FIG. 1). A throttle plate 24, which consists of a perforated plate or of a sieve plate, is fixedly but replaceably disposed in housing part 22, transversely to the direction of flow. Its active area corresponds to a permeability of 9%. Housing part 23 adjoins housing part 22 by means of a sealed joint, and its spacing from housing part 22 can be adjusted. The adjusting device is merely indicated by the arrow. It should be understood that this device must enable a very fine, accurate adjustment to be made. Housing part 23 contains, parallel to the throttle plate 24, a stack 25 of three perforated plates or sieve plates 26, 27, 28, the active areas of which correspond to permeabilities of 5%, 3% and 2%, and also contains a calming element 29 which is constructed as a sieve or sintered metal element. All these plates are very thin and are therefore sensitive to pressure. A support (which is not illustrated) may be necessary. The edge 30 of housing part 23 surrounds the edge 31 of housing part 22, and a pressure-tight sliding ring seal 32 is disposed between these edges 31, 32. Mutual adjustability is thereby ensured, and a gap 33 which forms a variable spacing a exists between the throttle plate 24 and the sieve plate 26. A sieve plate 34 is fixedly disposed in front of the first throttle plate 24 in the first housing part 22, and has a permeable area of 20%, a hole size of diameter 0.1 mm and a number of holes corresponding to about 2550 per $cm^2$.

Figure 3:
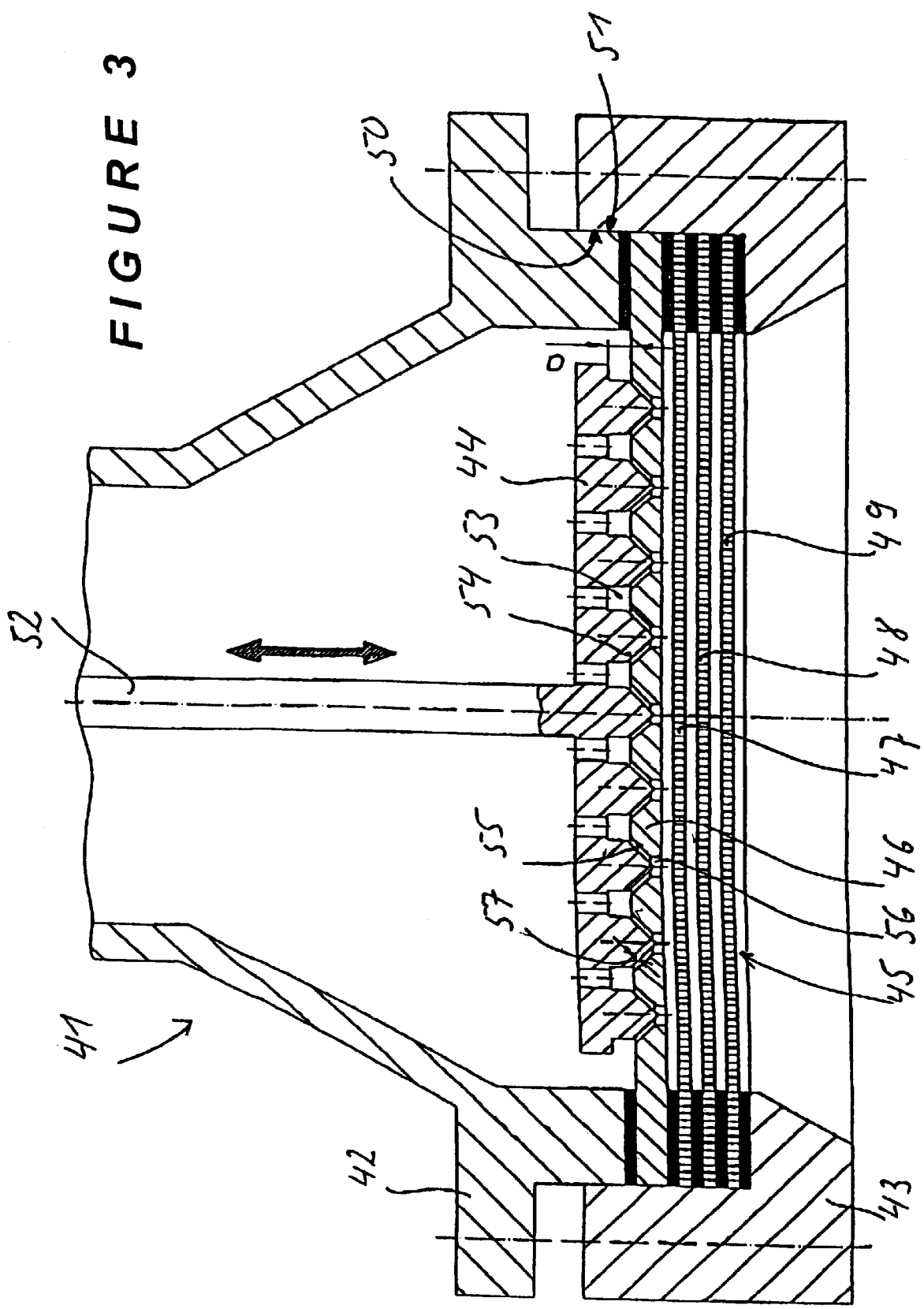
FIG. 3 shows a sectional illustration, on an enlarged scale, of a second embodiment of a creamer of the present invention.

The creamer 41 shown in FIG. 3 consists of a housing part 42 and of a housing part 43 which is rigidly attached thereto. Housing part 42 adjoins the outlet opening 9 (FIG. 1) of the mixing chamber 5 (FIG. 1). A first throttle plate 44, which consists of a perforated plate and which comprises a shaft 52, is disposed in housing part 42 so that it can be adjusted or finely adjusted in the direction of flow by means of an adjusting device which is merely symbolized as an arrow. Housing part 43 contains, parallel to the throttle plate 44, a fixedly screw-jointed stack 45 of perforated plates or sieve plates constructed as throttle plates 46, 47, 48, and contains a calming element 49 constructed as a sieve or as a sintered metal element. All these plates are very thin and are therefore sensitive. The edge 50 of housing part 43 surrounds the edge 51 of housing part 42 in an absolutely impervious manner. In this case, the adjustable throttle plate 44 comprises tapered holes 53, and conical points 54 are disposed between these holes 53 on the side of the throttle plate facing the perforated plate 46. The conical points point into holes 56 in the perforated plate or sieve plate 46, which holes comprise tapers 55 on their inlet side corresponding to the conical points 54, due to which a multiplicity of flow gaps 57 is formed, the height of which can be varied by varying the spacing a between the throttle plate 44 and the perforated plate or sieve plate 46 or between the throttle plate 44 and the stack 45.

EXAMPLE OF OPERATION

A continuously operating block foam installation was used as shown in FIG. 1. This had a working width of 2.1 m. A foamed material with an apparent density of 18 kg/$m^3$ was first produced.

60 l/min isocyanate and 100 l/min polyol were fed from the storage vessels 1, 2. 2 kg/min of carbon dioxide under a pressure of 40 bar were dissolved in the polyol in the pressurized mixing element 6. These reaction components were fed into the mixing chamber 5, which had a volume of 1800 $m^3$ and which was fitted with a shaft and plate stirrer. The prevailing pressure in the mixing chamber was 6 bar. The reaction mixture 13 which was produced passed through the outlet opening 9 into the adjoining creamer 10 and flowed through the sieve plate 34. The sieve plate 24, which was fixedly screwed into housing part 22, had a permeability corresponding to about 9% of its active area, a hole size of 2 mm diameter and a number of holes corresponding to about 3 per $cm^2$; its function was that of a throttle plate. A sieve plate 26 was disposed parallel thereto in the second housing part 23. This sieve plate had a permeability corresponding to about 4.5% of its active area, a hole size of 1 mm diameter and a number of holes corresponding to about 6 per cm$^2$. The variable spacing a between the throttle plate 24 and the sieve plate 26 was 0.3 mm. A calming sieve 29 was disposed downstream of the sieve plate 26 at a distance of 0.5 mm therefrom. The calming sieve had a permeability corresponding to about 10% of its active sieve area, a hole size of 0.1 mm diameter and about 1270 holes per cm$^2$. All the sieve plates were disposed parallel to each other and transverse to the direction of flow. The flow was therefore homogeneous between all the sieve plates and the residence time was short everywhere, in the optimum manner. On its emergence from the creamer 10, the reaction mixture 13 was suddenly depressurized, the carbon dioxide changed into its gaseous state and inflated the reaction mixture 13 to about ten times its volume, at a rate of about 1.5 m$^3$/min. The backflow barrier 12 prevented the foaming reaction mixture 13 from spreading in the opposite direction. The foamed material block 14 which was formed was conveyed away at a conveyor belt speed of 4 m/min. The foamed material block reached a height of about 1.1 m.

The production conditions were then changed during production, since a foamed material with an apparent density of 16 kg/m$^3$ was to be produced. All the parameters which are not specifically mentioned remained unchanged.

The feed rate of carbon monoxide was then altered, namely 4 kg/min of carbon dioxide were dissolved in the polyol. The creamer was adapted to these new conditions by altering the spacing a between the sieve plates to 0.15 mm. This was achieved by adjusting housing parts 22 and 23 in relation to each other. The optimum production of foamed material was thereby maintained.

What is claimed is:

1. An apparatus for producing foamed materials from reaction mixtures of free-flowing reaction components, which contain a dissolved foaming agent, comprising a mixing chamber having an outlet opening and having feed lines for the reaction components, wherein at least one of the feed lines comprises an element for introduction and dissolution of foaming agent, and wherein a depressurization element adjoins the outlet opening, wherein two perforated throttle plates or sieve throttle plates are disposed in said depressurization element, wherein spacing between said two plates can be varied during operation, and wherein a calming element is disposed after second plate.

2. An apparatus according to claim 1, wherein the depressurization element comprises a first housing part and a second housing part, wherein first throttle plate is fixably attached to the first housing part, whereas the second plate and the calming element are fixably disposed in the second housing part, and wherein said first and second housing parts are mutually sealed and wherein the spacing between said two plates can be varied by adjusting the two mutually sealed housing parts in relation to each other.

3. An apparatus according to claim 1, wherein first throttle plate is adjustably disposed in the depressurization element whereas the second throttle plate and the calming element are rigidly disposed in said depressurization element, and wherein the spacing between the two throttle plates can be varied by adjusting the fir rottle plate.

4. An apparatus according to claim 1, wherein the calming element comprises at least one sintered metal plate.

5. An apparatus according to claim 1, wherein at least one further plate is disposed between the second plate and the calming element.

6. An apparatus according claim 1, wherein at least one sieve plate or sintered plate is disposed in front of first plate.

7. An apparatus for producing foamed materials from reaction mixtures of free-flowing reaction components, which contain a dissolved foaming agent, comprising a mixing chamber having an outlet opening and having feed lines for the reaction components, wherein at least one of the feed lines comprises an element for introduction and dissolution of the foaming agent, and wherein a depressurization element adjoins the outlet opening, said depressurization element comprising a first housing part and a second housing part, wherein said first and second housing parts are mutually sealed, wherein two perforated throttle plates or sieve throttle plates are disposed in said depressurization element, wherein a first plate is fixably attached to the first housing part and a second plate and a calming element are fixably disposed in the second housing part and wherein spacing between said plates can be varied by adjusting the two mutually sealed housing parts in relation to each other.

* * * * *